United States Patent
Graham et al.

(10) Patent No.: US 8,402,267 B1
(45) Date of Patent: Mar. 19, 2013

(54) SECURITY ENHANCED NETWORK DEVICE AND METHOD FOR SECURE OPERATION OF SAME

(75) Inventors: James H. Graham, Sellersburg, IN (US); Jeffrey Hieb, Shelbyville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 304 days.

(21) Appl. No.: 12/726,105

(22) Filed: Mar. 17, 2010

Related U.S. Application Data

(60) Provisional application No. 61/161,179, filed on Mar. 18, 2009.

(51) Int. Cl.
G06F 21/00 (2006.01)

(52) U.S. Cl. ........... 713/164; 713/182; 713/193; 726/26

(58) Field of Classification Search .................... 713/164
See application file for complete search history.

(56) References Cited

U.S. PATENT DOCUMENTS

| | | | |
|---|---|---|---|
| 6,173,438 B1 | 1/2001 | Kodosky et al. | |
| 6,628,992 B2 | 9/2003 | Osburn, III | |
| 6,715,139 B1 | 3/2004 | Kodosky et al. | |
| 6,950,851 B2 | 9/2005 | Osburn, III | |
| 6,961,753 B1 | 11/2005 | Osburn, III | |
| 6,970,909 B2 | 11/2005 | Schulzrinne | |
| 7,246,156 B2 | 7/2007 | Ginter et al. | |
| 7,376,191 B2 | 5/2008 | Melick et al. | |
| 7,545,868 B2 | 6/2009 | Kennedy et al. | |
| 7,647,562 B2 | 1/2010 | Ghercioiu et al. | |
| 2003/0196187 A1 | 10/2003 | Kodosky et al. | |
| 2004/0010734 A1 | 1/2004 | Ghercioiu et al. | |
| 2005/0131922 A1 | 6/2005 | Kennedy et al. | |
| 2005/0289274 A1 | 12/2005 | Ghercioiu et al. | |
| 2006/0288426 A1* | 12/2006 | Saito .............................. 726/26 |
| 2007/0294369 A1 | 12/2007 | Ginter et al. | |
| 2008/0016313 A1* | 1/2008 | Murotake et al. ............. 711/173 |

(Continued)

FOREIGN PATENT DOCUMENTS

| | | |
|---|---|---|
| WO | 9909473 | 2/1999 |
| WO | 0076158 | 12/2000 |

(Continued)

OTHER PUBLICATIONS

Kalfa, Winfried, "Proposal of an External Processor Scheduling in Micro-kernel based Operating System", May 1992.*

(Continued)

*Primary Examiner* — Taghi Arani
*Assistant Examiner* — Mohammad L Rahman
(74) *Attorney, Agent, or Firm* — Stites & Harbison PLLC; Jeffrey A. Haeberlin

(57) ABSTRACT

A security enhanced network device includes a processor, a memory, and a communication controller operably connected to form a processing device. A microkernel provides a partitioning between a communication address space, a security enforcement address space, and a protected operations address space. The communication address space contains communications threads for interacting with a network. The protected operations address space contains protected operations threads for performing protected operations. The security enforcement address space contains security threads for providing secure isolation of the protected operations address space from the communication address space. A method of secure operation of the network device includes: partitioning the network device into the communication address space, the security enforcement address space, and the protected operations address space; interacting with the network; providing secure isolation of the protected operations address space from the communication address space; and performing protected operations.

1 Claim, 7 Drawing Sheets

U.S. PATENT DOCUMENTS

| | | | |
|---|---|---|---|
| 2008/0159416 | A1 | 7/2008 | Melick et al. |
| 2008/0209033 | A1 | 8/2008 | Ginter et al. |

FOREIGN PATENT DOCUMENTS

| | | |
|---|---|---|
| WO | 0231669 | 4/2002 |
| WO | 03094461 | 11/2003 |
| WO | 03107626 | 12/2003 |
| WO | 2004006205 | 1/2004 |
| WO | 2004111785 | 12/2004 |
| WO | 2006089411 | 8/2006 |
| WO | 2007100633 | 9/2007 |

OTHER PUBLICATIONS

Alves-Foss et al., "A Multi-Layered Approach to Security in High Assurance Systems," Proceedings of the Thirty-Seventh Annual Hawaii Internal Conference on System Sciences, (HICSS'04)—Track 9, 2004.

Heib et al., "Chapter 9, Designing Security-Hardened Microkernels for Field Devices," Critical Infrastructure Protection II, 2008, pp. 123-134, Springer Science + Business Media, L.L.C., New York, NY Guffy et al., Evaluation of MILS and Reduced Kernel Security Concepts for SCADA Remote Terminal Units, 2006, Technical Report TR-ISRL-06-02, Intelligent Systems Research Laboratory, Department of Computer Engineering and Computer Science, University of Louisville, Louisville, Kentucky.

Gumstix, Gumstix Verdex Pro XM4 COM, product information accessed at http://www.gumstix.com/store/catalog/product_info.php?products_id=209, product specifications accessed at http://www.gumstix.net/Hardware/view/Hardware-Feature-Overview-Sheets/Gumstix-Verdex-Pro-Feature-Overview/112.html.

Gumstix, Gumstix Verdex Pro XM4 COM, product details accessed at http://www.gumstix.com/store/catalog/product_info.php?products_id=209&show_tab=details.

Gumstix, Gumstix netpro-vx, product information accessed at http://www.gumstix.com/store/catalog/product_info.php?products_id=207.

Hanebutte et al., "Software Mediators for Transparent Channel Control in Unbounded Environments," Proceedings of the 2002 IEEE Workshop on Information Assurance and Security, 2002, pp. 30-35.

Hartig et al., "The Nizza Secure-System Architecture," Proceedings of the 1st International Conference on Collaborative Computing: Networking, Applications and Worksharing (CollaborateCom), 2005.

Hieb, J.L., "Microkernels for Hardened RTUs," Chapter VII from PhD Dissertation of J. L. Hieb, University of Louisville, May 2008.

Hieb et al., "Security-Enhanced Remote Terminal Units for SCADA Networks," Proceedings of Nineteenth ISCA International Conference on Computer Applications in Industry and Engineering, 2006, pp. 271-276.

Hieb et al., "Chapter 10, Security Enhancements for Distributed Control Systems," Critical Infrastructure Protection, E. Goetz and S.Shenoi (Eds.), Springer, Boston, Massachusetts, 2007, pp. 133-146.

Igure et al., "Security Issues in SCADA Networks," Computers and Security, 25(7), 2006, pp. 498-506.

Liedtke J., "On Micro-Kernal Construction," ACM SIGOPS Operating Systems Review, 29(5), 1995, pp. 237-250.

Hieb et al. "Microkernel-Based Security-Hardened Field Devices for Distributed Control Systems," compilation of printed slides presented at 2nd IFIP Working Group 11.10 International Conference on Critical Infrastructure Protection, Mar. 18, 2008, George Mason University, Arlington, VA.

Miller A, "Trends in Process Control Systems Security," IEEE Security and Privacy, 3(5), 2005, pp. 57-60.

Heiser, "Iguana User Manual," National ICT Australia (NICTA), Rev. 1.62, 2004, Eveleigh, Australia, accessed at http://ertos.nicta.com.au/software/kenge/iguana-project/latest/userman.pdf.

Open Kernel Labs, "OKL4 Microkernel Reference Manual," API Version 03, document No. OK 10000: 2006, Rev. 12, 2008, accessed at http://wiki.ok-labs.com/downloads/release-3.0/okl4-ref-manual-3.0.pdf.

Singaravelu et al., "Reducing TCB Complexity for Security-Sensitive Applications: Three Case Studies," ACM SIGOPS Systems Review, 40(4), 2006, pp. 161-174.

Tanenbaum et al., "Can we Make Operating Systems Reliable and Secure?," IEEE Computer, 39(5), 2006, pp. 44-51.

Farris et al., "Evaluation of Secure Peer-to-Peer Overlay Routing for Survivable Scada Systems," Proceedings of the 2004 Winter Simulation Conference, pp. 300-308.

Cosse, Jr et al., "Smart Industrial Substations, A Modern Integrated Approach to Plant Safety, Reliability, and Production," IEEE Industry Applications Magazine, vol. 11, No. 2, 2005, pp. 12-20.

Lizzi et al., "Prototyping QoS based Architecture for Power Plant Control Applications," IEEE Int. Workshop Factory Commun. Syst., 2000, Sep. 6-8, pp. 119-126.

Cawfield, "Achieving Fault-Tolerance with PC-Based Control," ISA EXPO 98, International Conference and Exposition for Advancing Measurement and Control Technologies, Products, and Services, Automation and Control Issues and Solutions, vol. 1, 1998, pp. 197-209.

\* cited by examiner

SECURITY ENHANCED NETWORK DEVICE AND METHOD FOR SECURE OPERATION OF SAME

CROSS-REFERENCE TO RELATED APPLICATIONS

This application claims priority from U.S. Provisional Application Ser. No. 61/161,179, filed Mar. 18, 2009, the entire disclosure of which is incorporated herein by this reference.

STATEMENT REGARDING FEDERALLY SPONSORED RESEARCH OR DEVELOPMENT

The presently disclosed subject matter was made with support from the U.S. Government under Grant Number 2004-IJ-CX-K055 awarded by the Department of Justice, National Institute of Justice. Thus, the U.S. Government has certain rights in the presently disclosed subject matter.

THE NAMES OF THE PARTIES TO A IOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to security hardening of network devices, such as supervisory control and data acquisition (SCADA) field devices, against electronic intrusions (cyber-attacks).

2. Background

Network devices in computer networks, such as field devices employed in distributed control systems (DCSs), may connect devices and elements requiring protected operations, such as sensors and actuators, to control networks providing, for example, remote measuring and control capabilities. Field devices employed in DCSs will be used herein as an example of network devices requiring protected operations.

Early DCSs were isolated proprietary systems with limited exposure to cyber threats. For example, such DCSs often utilized dedicated serial communication lines and implemented proprietary communication protocols in connecting field devices to supervisory control and data acquisition (SCADA) system components. However, modern DCSs often engage commercial computing platforms and operating systems (e.g., Linux) and industry standard network technologies (e.g., Ethernet, TCP/IP), which significantly increase the vulnerability of the DCSs to cyber attacks.

While major disasters have thus far been averted, incidents such as the 2003 Slammer worm penetration of the Davis-Besse nuclear power plant network in Oak Harbor, Ohio, and the 2006 hacker attack on a water treatment facility in Harrisburg, Pa. underscore the significance of the cyber threat.

Field devices are attractive targets for cyber attacks on control systems. Since these devices are used for measurement and control of physical systems, preventing these attacks is essential to securing DCSs and, by extension, the critical infrastructures assets they operate. Unlike early field devices, which were highly specialized systems, modern field devices use commercially available hardware and software and can be attacked quite easily.

Thus, there is generally a need to secure network devices, such as field devices, and their operating systems.

In traditional IT communication structure, security is implemented by protecting servers (e.g., web servers), database "back ends," etc., and the perimeter network devices are less protected ("hard protection in the middle, soft protection on the outside" security design). However, as discussed above, for SCADA networks there is a need to also protect perimeter network devices, such as the field devices in SCADA systems, which perform sensitive operations (similar to protecting the individual PCs in the traditional IT structure).

Efforts toward this end, to date, have included implementation of firewalls, and some work in adding security to communication protocols. SCADA protocols are implemented in the application layer of an IT device. However, for IT devices the operating system, and hardware, is the security enforcement base on which security in the application layer depends. The operating system itself, is a potential "attack surface." Ultimately, any security layer above the operating system depends on the operating system to enforce that security.

With a monolithic kernel, which includes the operating system, drivers, and file system, if the operating system can be attacked, then security can be circumvented.

A microkernel is a kernel that contains only those elements that cannot be implemented outside the kernel. Instead of having an operating system that includes the functionality traditionally associated with most operating systems, such as Windows, only those functions that must be in the operating system remain therein. For example, Linux has approximately 15 million lines of code, and Windows has approximately 30 million lines of code. The OKL4, which is a microkernel, has only about 15,000 lines of code.

FIG. 1 is a schematic comparison of a monolithic kernel 10 to a microkernel 12.

Multiple independent levels of security (MILS) 14 (FIG. 2) and Nizza 16 (FIG. 3) are two microkernel-based security architectures. The MILS architecture, which was developed for high assurance and high performance computing, is based on Rushby's separation kernel (see: J. Liedtke, On microkernel construction, ACM SIGOPS Operating Systems Review, vol. 29(5), pp. 237-250, 1995). The MILS architecture enforces strict security and separation policies on data and processes within a single processor (see: A. Tanenbaum, J. Herder and H. Bos, Can we make operating systems reliable and secure? IEEE Computer, vol. 39(5), pp. 44-51, 2006). The Nizza architecture is based on the L4 microkernel and protects security critical code.

MILS and Nizza employ isolated partitions, each with its own protection domain, that allow software and data of different security levels or sensitivity to be decoupled from potentially less secure software. Secure compartmentalization of components and inter-process communication (IPC) allow the trusted computing base (TCB) to remain small, comprising only the kernel and security-critical code; application software resides outside the TCB. In the MILS architecture, this enables high assurance application layer reference monitors to be inserted between application software components. In Nizza, security-critical code is removed from commercial applications and placed in a protected isolated compartment, keeping the TCB small. An application of Nizza is to the secure signing of email (see: L. Singaravelu, C. Pu, H. Hartig and C. Helmuth, Reducing TCB complexity for security-sensitive applications: Three case studies, ACM SIGOPS Systems Review, vol. 40(4), pp. 161-174, 2006).

MILS and Nizza primarily focus on protecting the confidentiality of data. MILS is designed for government and military systems that have multilevel security (MLS) requirements, where independent systems have historically been used for different security levels. Nizza is aimed at desktop and commodity computing applications that require small TCBs, mainly for protecting sensitive user data.

However, availability and integrity—rather than confidentiality—are the principal goals in securing sensitive network devices themselves, such as field devices in SCADA systems. As such, MILS and Nizza do not provide the requisite functionality for securing such network devices.

BRIEF SUMMARY OF THE INVENTION

Generally described, in accordance with one aspect of the invention, a security enhanced network device includes a processor, a memory, and a communication controller operably connected to form a processing device. A microkernel operating on the processing device provides a partitioning between a communication address space, a security enforcement address space, and a protected operations address space. The communication address space contains communications threads for interacting with a network. The protected operations address space contains protected operations threads for performing protected operations. The security enforcement address space contains security threads for providing secure isolation of the protected operations address space from the communication address space.

More specifically described, the microkernel provides partitioning of processor execution time between the communications threads, the protected operations threads, and the security threads. The microkernel also mediates communication between the communications threads, the protected operations threads, and the security threads. Additionally, the microkernel may receive an identity of a sender of an inter-process communication, and provide the identity of the sender to a receiver of the inter-process communication, such that the identity of the sender cannot be forged.

The communication address space may include physical resources associated with network hardware, a driver for the network hardware, and protocol stacks for supported communication protocols.

The protected operations may be field device control and data acquisition operations in a supervisory control and data acquisition system.

In accordance with an important implementation, the communication threads include SCADA protocol threads for interfacing with the network through TCP/IP stack threads and an Ethernet controller driver thread, the protected operations threads include an I/O database interface thread for retrieving and changing field equipment values stored in an I/O database, and the security threads include a field device security enforcement point thread for authenticating a request from the SCADA protocol threads via inter-process communication. If authenticated, the security threads then make a request to the I/O database interface thread and forward a response back to the SCADA protocol threads.

The security threads may further include a cryptographic hash function, shared secret values, and a pseudo random number generator. Then, the field device security enforcement point thread authenticates the request from the SCADA protocol threads using the cryptographic hash function, the shared secret values, and the pseudo random number generator.

In accordance with another aspect of the invention, a method of secure operation of a network device includes: partitioning, by a microkernel executing on a processing device, the network device into a communication address space, a security enforcement address space, and a protected operations address space; interacting, by communication threads of the communication address space, with a network; performing, by protected operations threads of the protected operations address space containing protected operations; and providing, by security threads of the security enforcement address space, secure isolation of the protected operations address space from the communication address space.

The method may further include partitioning, by the microkernel, of processor execution time between the communication threads, the protected operations threads, and the security threads, and mediating, by the microkernel, communication between the communication threads, the protected operations threads, and the security threads.

Still further, the method may include: receiving, by the microkernel, an identity of a sender of an inter-process communication; and providing, by the microkernel, the identity of the sender to a receiver of the inter-process communication, such that the identity of the sender cannot be forged.

In accordance with an important implementation, the protected operations are field device control and data acquisition operations in a supervisory control and data acquisition system. Additional steps then include: interfacing, by SCADA protocol threads of the communication threads, with the network through TCP/IP stack threads and an Ethernet controller driver thread; retrieving, by an I/O database interface thread of the protected operations threads, values stored in an I/O database; and authenticating, by a field device security enforcement point thread of the security threads, a request from the SCADA protocol threads via inter-process communication and, if authenticated, then making a request to the I/O database interface thread, and forwarding a response back to the SCADA protocol threads. The step of authenticating the request from the SCADA protocol threads may further include using a cryptographic hash function, shared secret values, and a pseudo random number generator.

In accordance with yet another aspect of the invention, a method of operation of a microkernel executing on a processing device includes: partitioning a network device into a communication address space, a security enforcement address space, and a protected operations address space; and providing secure isolation of the protected operations address space from the communication address space, by security threads of the security enforcement address space.

The method of operation of a microkernel may further include partitioning processor execution time between the communications threads, the protected operations threads, and the security threads, and mediating communication between the communications threads, the protected operations threads, and the security threads.

Further, the method of operation of a microkernel may include: receiving an identity of a sender of an inter-process communication; and providing the identity of the sender to a receiver of the inter-process communication, such that the identity of the sender cannot be forged.

In one implementation of the method of operation of a microkernel, the protected operations are field device control and data acquisition operations in a supervisory control and data acquisition system. The method may then further include authenticating, by a field device security enforcement point thread of the security threads, a request from SCADA protocol threads of the communication threads via inter-process communication. If authenticated, the method may then include: making a request to an I/O database interface thread of the protected operations threads; and forwarding a response back to the SCADA protocol threads. The step of authenticating the request from the SCADA protocol threads may further include: verifying that the request is a legitimate operation by consulting a security policy stored in the security enforcement address space; sending a challenge message to an initiator of the request; comparing a response to the challenge message to an expected response calculated using a pre-shared secret, nonce, and a cryptographic hash function. If the response to the challenge message matches the expected response, then the method includes the step of consulting the security policy for the initiator of the request to determine if the initiator is allowed to carry out the operation.

Other features and advantages of the invention will be set forth in, or apparent from, the detailed description of exemplary embodiments of the invention found below.

DETAILED DESCRIPTION OF EXEMPLARY EMBODIMENTS OF THE INVENTION

In the exemplary embodiments described herein, a microkernel is used in securing network devices, such as field devices in SCADA systems. While field devices in SCADA systems are used as examples of network devices requiring securing, it should be understood that such field devices are exemplary and that the scope of the invention is set forth in the claims which follow hereafter.

Reducing the size of the kernel reduces vulnerabilities. Less lines of code means that there are fewer possibilities for the kids of errors that introduce vulnerabilities. A smaller kernel also means the kernel itself is less complicated, making it more likely that vulnerabilities are not unknowingly introduced. Finally, only for small kernels is formal analysis possible. For instance, if one can access the OS, any memory location can be written to, even if that memory address is actually memory mapped I/O that sets a field device output to a value that is different from the value that the control application intends. Thus, the operating system is always responsible for enforcing security.

The microkernel provides partitioning of address spaces or address bases. As used herein, "address spaces" are logical units of memory that are separated or isolated from each other.

Also, as used herein, "threads" are execution units (threads are followed to determine what the next instruction is then going to be loaded into the processor).

Further, as used herein, "interprocess communication" (IPC) is communication between different threads, in the same and different address spaces. A thread in one address base is interfaced into another address base through the operating system's IPC mechanism. That interprocess communication is the point at which the security features of the device are inserted.

The microkernel also provides partitioning of execution time by processes or threads of a microprocessor, so that no process can monopolize the microprocessor and no process can access address bases unrestricted, as described in more detail below.

Still further, as used herein, the phrase "trusted computing base" means the software and hardware that is responsible for enforcing security in that network device. Elements that are required to work correctly in order for security to be enforced are part of the trusted computing base. For many systems, the trusted computing base includes the operating system, and may also include hardware, for example, a trusted platform module (TPM).

In the exemplary embodiments of a security enhanced network device disclosed herein, TCP/IP and other drivers are located outside of the operating system kernel because they are places of vulnerabilities (i.e., if there is a vulnerability in a driver, if that driver is in the OS, once that driver is compromised, an attacker has free access to the entire system because they are executing in the operating system's privilege mode).

Figure 1:
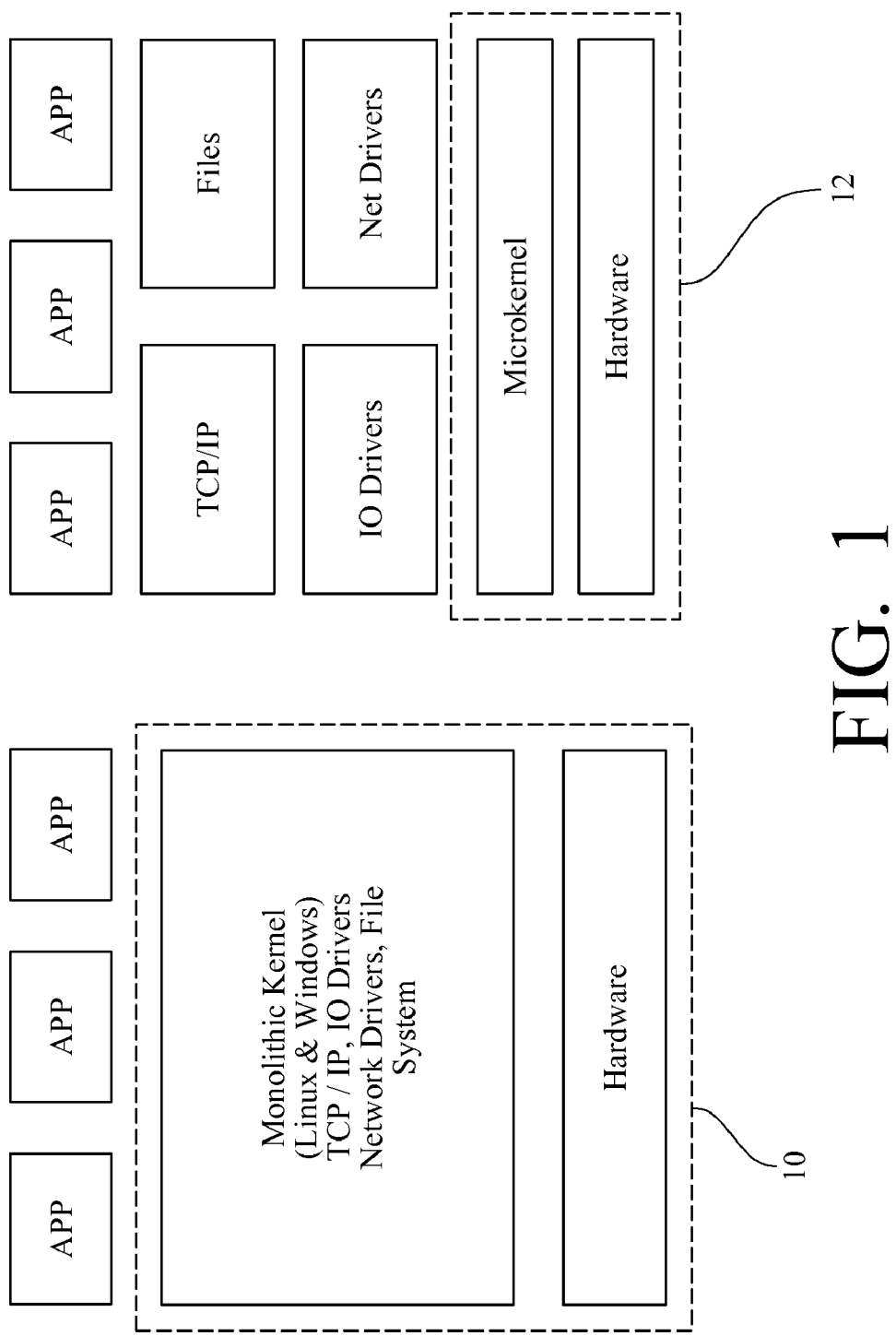
FIG. 1 is a schematic diagram comparing a monolithic kernel architecture and a microkernel architecture.
Figure 2:
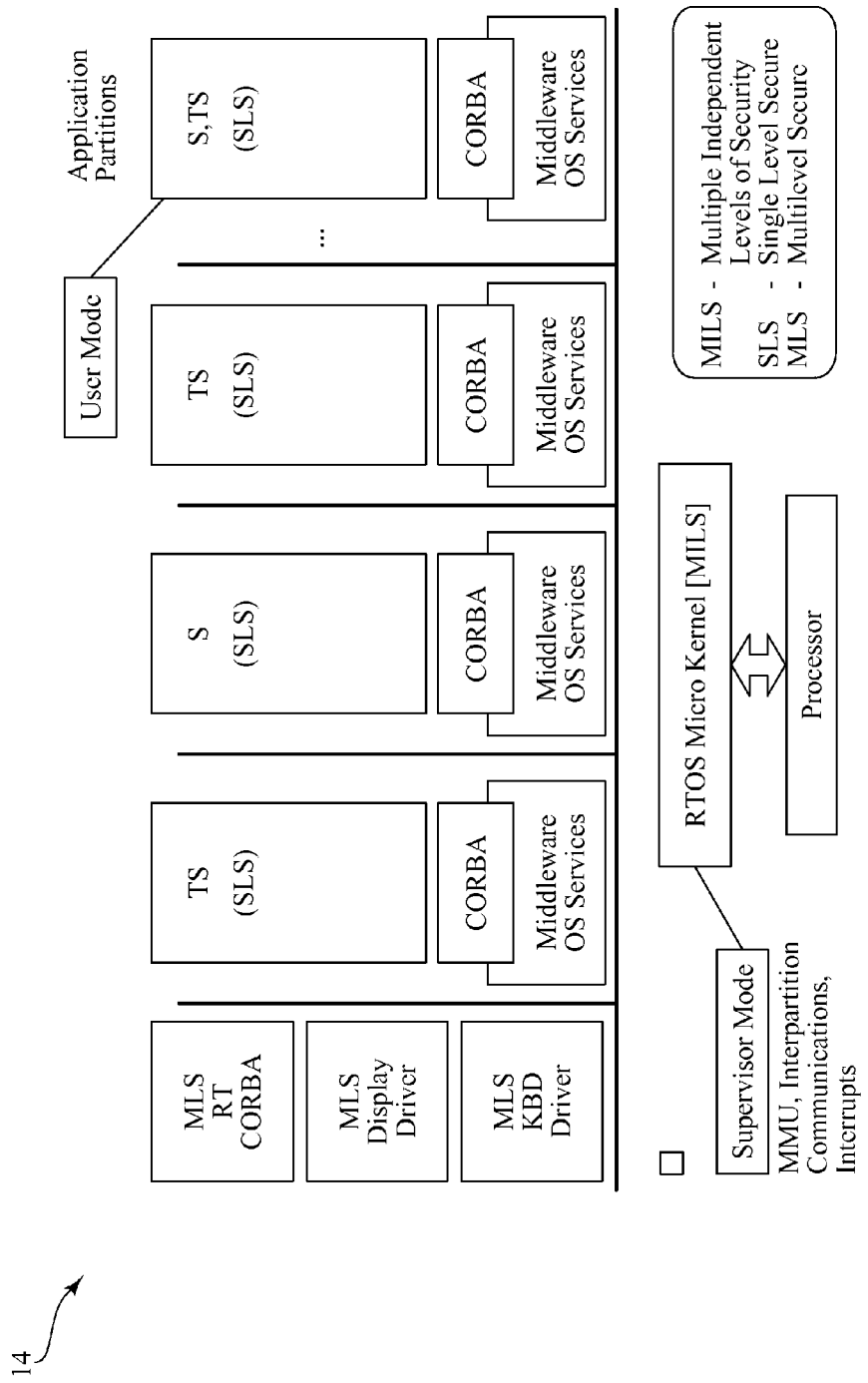
FIG. 2 is a schematic diagram of a MILS security architecture.
Figure 3:
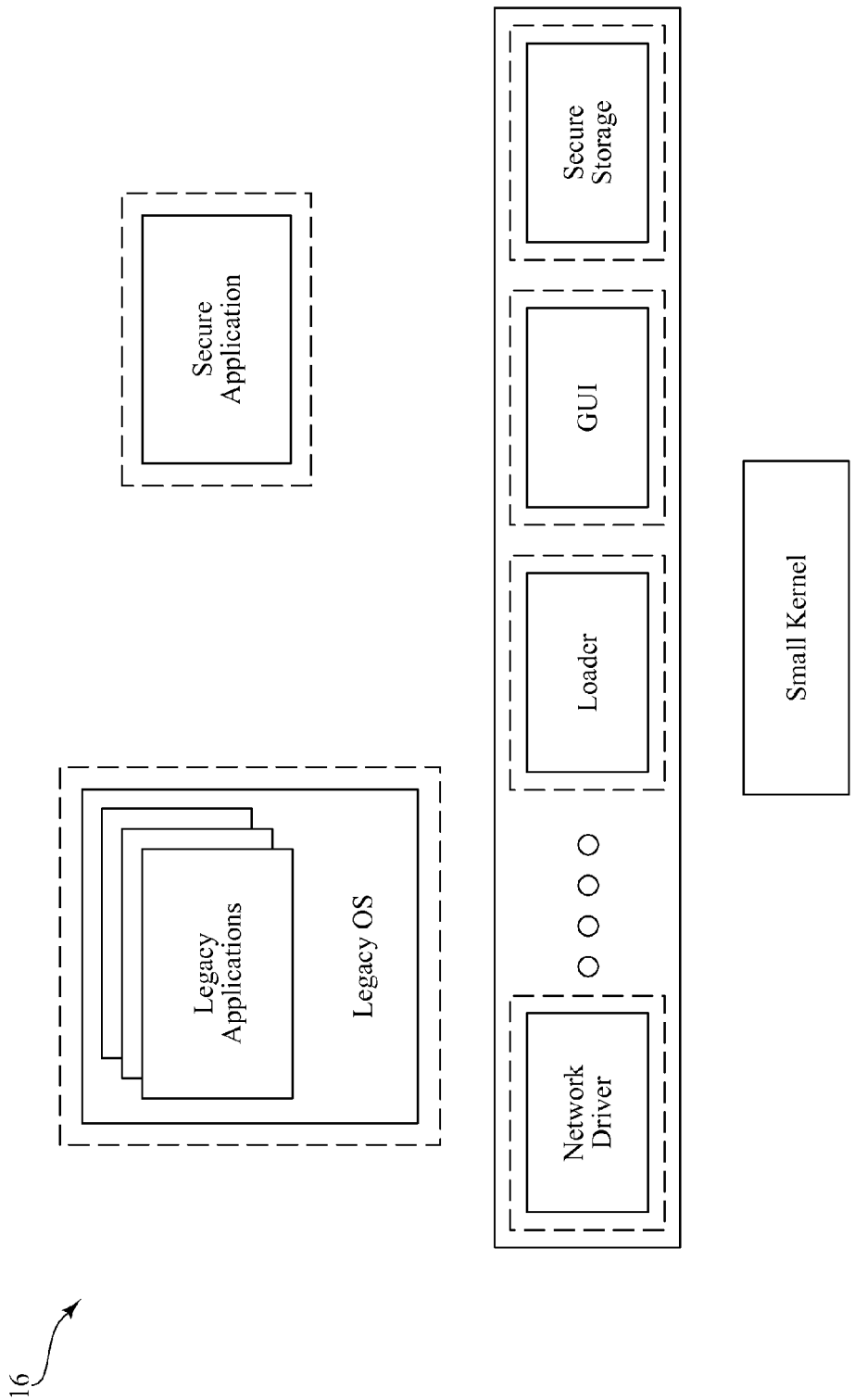
FIG. 3 is a schematic diagram of a Nizza security architecture.
Figure 4:
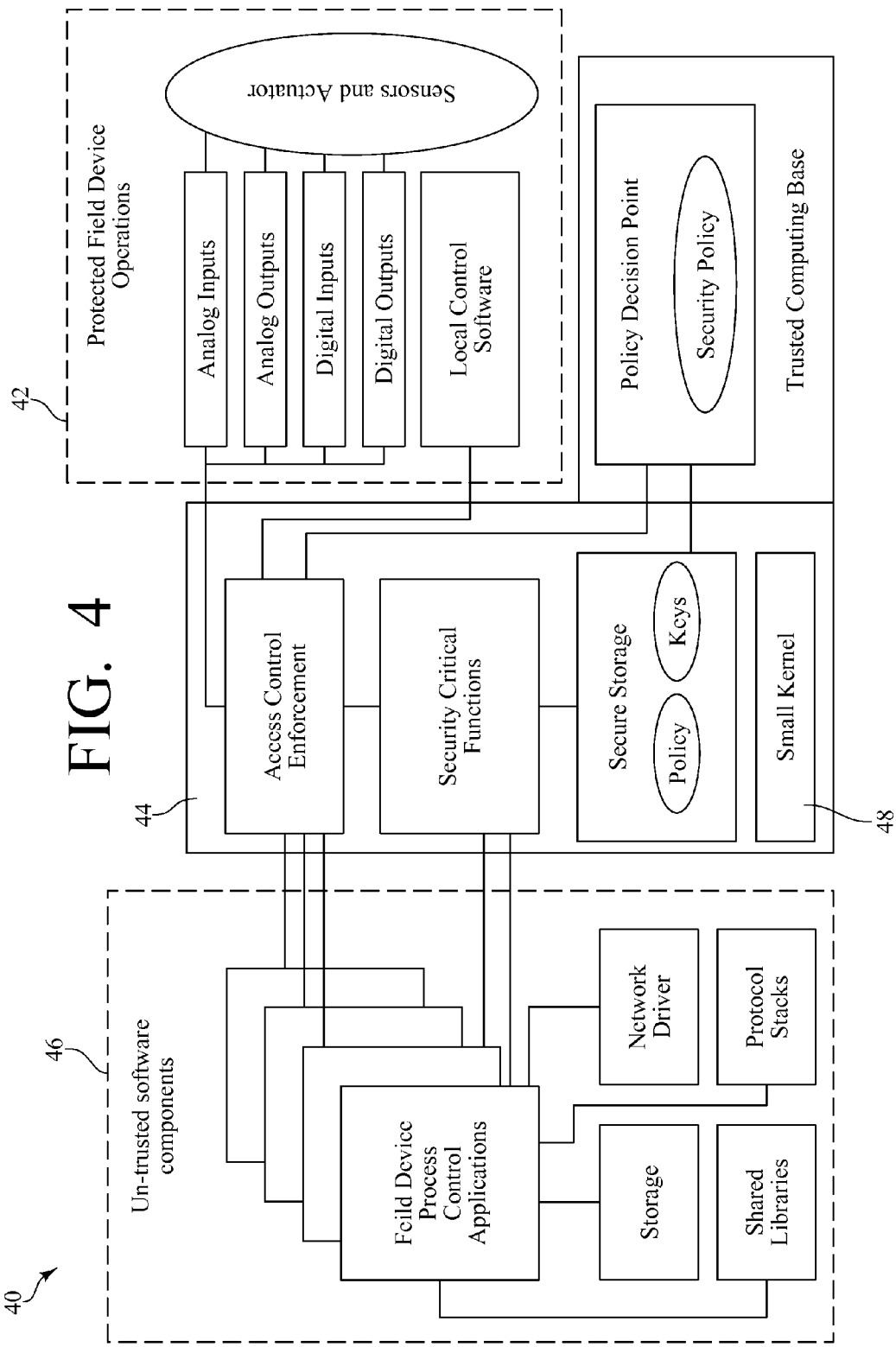
FIG. 4 is a functional block diagram of an exemplary reduced kernel, small TCB hardened field device for DCS.

FIG. 4 is a functional block representation of an exemplary reduced kernel, small TCB security-hardened filed device 40 for DCS.

A microkernel 48 provides the ability to create separate address spaces and threads of execution (or processes). More specifically, the microkernel 48 provides partitioning between a protected operations address space 42, a security enforcement address space 44, and a communication address space 46. The microkernel 48 enforces isolation between these address spaces. By isolation it is meant that each independent address space can only access specific physical resources (via memory) to which it is assigned at design or boot time, and this isolation is unalterable by any address space. The microkernel 48 provides the ability for one or more threads of execution in each address space. Thus there are executing "processes" in each address space. The microkernel 48 enforces a partitioning of the processor use by each thread or address space. As mentioned above, partitioning of execution time means that specific threads, and therefore specific address spaces, can be allotted a limited about of execution time, such that no thread or address space can obtain permanent control of the processor. Finally the microkernel 48 provides the ability for communication between threads in the same address space and in different address spaces. More importantly, the microkernel mediates all communication between processes or threads, and so can prevent threads in one address space from communicating with threads in another address space, and allows the system designer to specify a priori which threads or address spaces are allowed to communicate. The identity of the sender of an inter-process communication is provided to the receiver by the microkernel 48, and therefore cannot be forged.

The communication address space 46 contains all external facing communications hardware and software components. This includes: physical resources associated with the network hardware, the driver for that network hardware, and the protocol stacks for supported SCADA communications. The communication address space 46 is isolated, and the microkernel 48 allows threads are in the communication address space 46 to communicate only with threads in the security enforcement address space 44.

The security enforcement address space 44 contains security related software components, including security critical functions and secure storage of security policy information and security secrets or keys. The security enforcement address space 44 and the microkernel 48, together, make up the trusted computing base (TCB) for the field device 40.

It should be noted that in FIG. 4, the microkernel 48 is included in the TCB, but from an address space perspective, the microkernel 48 lies outside the address spaces 42, 44, 46.

The microkernel 48 mediates communication between threads in the security enforcement address space 44, and the communication address space 46 and the protected operations address space 42.

The protected operations address space 42 contains the physical resources that provide analog and digital I/O to physical device and elements, such as sensors and actuators, associated driver software, and a simple interface that allows threads in the security enforcement address space 44 to read and write analog and digital I/O values. If the field device is "intelligent" and is able to carry out local control on its own, associated local control software is located in the protected operations address space 42.

In FIG. 4, the separate address spaces, limited inter-process/inter-address space communication, and microkernel create isolation between: (i) critical field device resources and operations, such as analog and digital input/output, via the protected operations address space 42; (ii) security critical data and code (e.g., cryptographic keys and cryptographic operations) in the security enforcement address space 44; and (iii) network-connected field device applications in the communication address space 46. This enables the critical field device resources and operations to continue to execute even when network components are attacked. Furthermore, in the event of a network based attack, only resources in the communication address space 46 are possibly compromised. When threads, malicious or benevolent, in the communication address space 46 communicate with threads in the security enforcement address space 44, security measures continue to be enforced, as the identity of threads in the security enforcement address space 44 communicating with threads in the communication address space 46 is provided by the microkernel 48. If a thread in the communication address space 46 is granted specific privileges, such as the privilege to change and analog output value, that privilege persists for a limited duration, specified by the security policy, and/or possibly by a SCADA protocol specification. For safety or security critical operations, this duration is limited to the amount of time taken to carry out the operation, and no more. If the thread requests to carry out the operation again, the thread must re-authenticate. Security keys required for re-authentication are not stored in the communication address space 46, and are inaccessible to a malicious thread in that address space. For an individual thread in the communication address space 46, security is enforced by threads from the security enforcement address space 44. Specifically, association of a thread in the communication address space 46 with authentication credential is done by a thread in the security enforcement address space 44. This approach also isolates the security critical functions (data and code) in the security enforcement address space 44 in a separate compartment where they are protected from unauthorized access by a compromised thread in the communication address space 46. Field device integrity is further enhanced by a role based access control policy the separates the privileges between different roles, specifically between different engineering roles and different operator roles.

Figure 5:
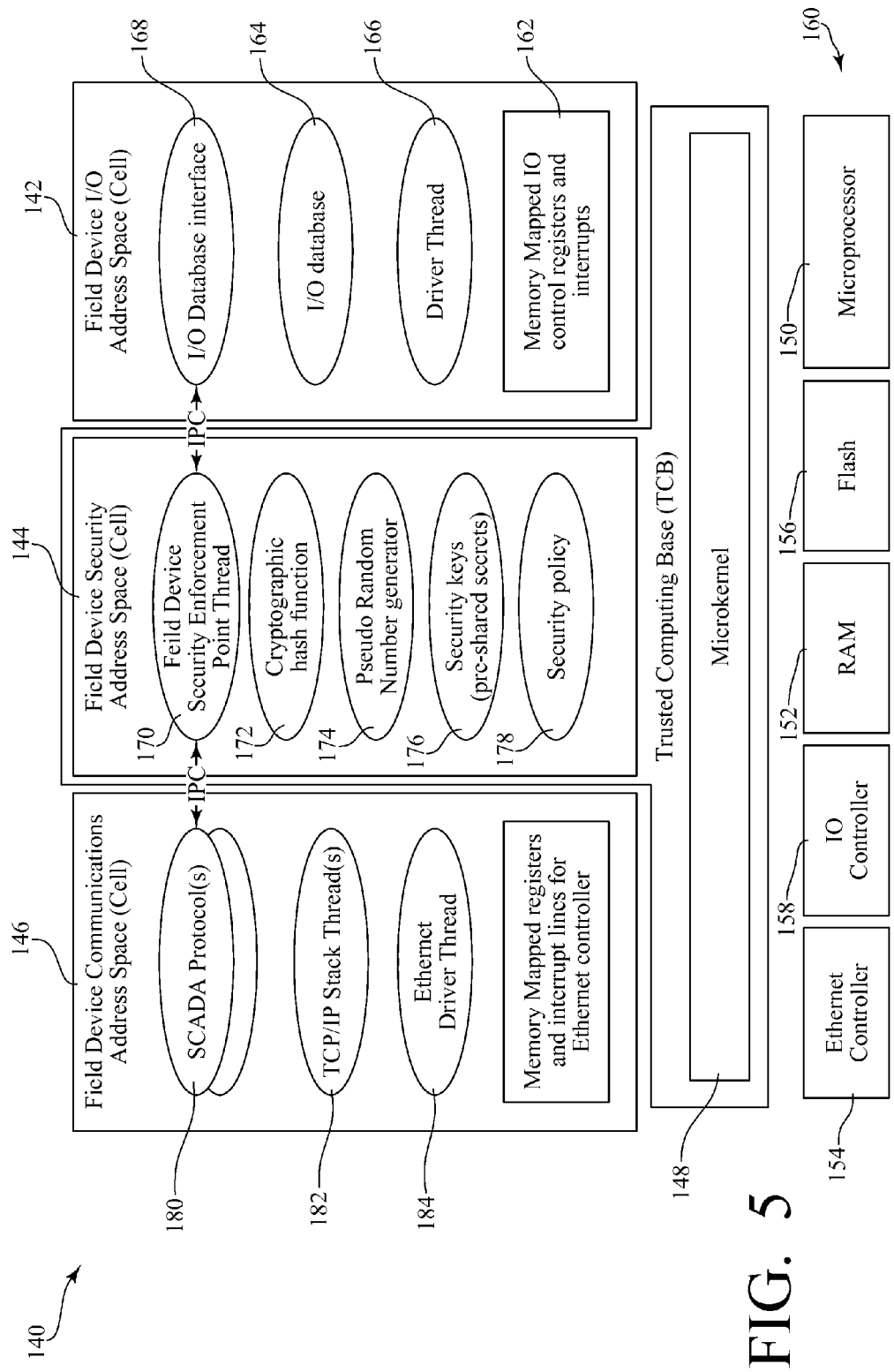
FIG. 5 is a schematic diagram of an exemplary security enhanced network device according to the invention.

FIG. 5 is a schematic representation of an exemplary security enhanced network device 140, such as a field device of a SCADA system, including a microkernel 148 that provides a partitioning between a protected operations address space 142, a security enforcement address space 144, and a communication address space 146. The network device 140 also includes a microprocessor 150, a memory 152 (RAM), a communication controller 154 (Ethernet controller), a flash memory 156, and an IO controller 158, all operably connected to form a processing device 160, upon which the microkernel 148, the protected operations address space 142, the security enforcement address space 144, and the communication address space 146 operate.

Analog and digital IO hardware is connected to the network device by the IO controller 158. The IO controller 158 and control registers 162 are mapped into the protected operations address space 142. A thread in the protected operations address space 142 operates the IO controller 158, collects values of connected analog and digital inputs, and updates their values in an IO database 164, a shared memory section within the protected operations address space 142. An IO driver thread 166 also checks for changes in analog or digital output values in the IO database 164, and writes the values to the connected analog and digital outputs through the IO controller 158. An IO database interface thread 168, listens for IPC communications only from a field device security enforcement point thread 170. IPC communications from the field device security enforcement point thread 170 are either requests for values stored in the IO database 164, or requests to change values stored in the IO database 164. The IO database interface thread 168 fulfills these requests. Resources in the protected operations address space 142, specifically the control registers 162 of the IO controller 158 and the IO database 164, cannot be accessed by threads other than through the security enforcement address space 144.

In the security enforcement address space 144, a cryptographic hash function 172 and a pseudo random number generator 174 provide needed security functions to authenticate requests that come through the communication address space 146. Security keys or pre-shared secrets 176 are stored in the security enforcement address space 144, where they cannot be accessed or modified by threads in the communication address space 144.

SCADA protocol thread(s) 180 interface with a control network through the Ethernet controller 154 by communicating through a TCP/IP stack thread(s) 182 and a Ethernet driver thread 184, all contained within the communication address space 146. Using IPC, the SCADA protocol thread(s) 180 communicate with the field device security enforcement point thread 170.

The field device security enforcement point thread 170 accepts requests for IO data reads and writes on behalf of the IO database interface thread 168. If the SCADA protocol thread 180 is currently assigned the permission associated with the request, then the field device security enforcement point thread 170, makes the appropriate request to the IO database interface thread 168 and forwards the response back to the requesting SCADA protocol thread 180. If the SCADA protocol thread 180 is not currently assigned the privilege associated with the request, then the field device security enforcement point thread 170 and the SCADA protocol thread 180 must negotiate an authentication.

The authentication makes use of the cryptographic hash function 172 and a value generated by the pseudo random number generator 174. Additional data to be included in the hash can be supplied by the SCADA protocol thread 180, allowing the SCADA protocol thread 180 to implement, possibly multiple, security schemes described by different SCADA protocols but without security functions and keys being present in the communication address space 146. If the security negotiation is successful, and the appropriate permission is now associated with SCADA protocol thread 180, then the request is forwarded by the field device security enforcement point thread 170 to the IO database interface thread 168. A security policy thread 178 dictates the assignment of privileges to threads based on the role of user authenticated and criteria such as time of day, day of the week, and current mode of operation. The duration the permission is assigned to the thread is defined by the security policy thread 180.

In the exemplary network device 140, processor time is portioned between each address space. Time partitioning prevents any thread from starting a process and never releasing the processor 150. Time partitioning works through priorities and privileges (i.e., scheduler functionality). By setting priorities, threads in communication address space 146 can never monopolize the processor 150. Three vertical levels, high priority items, medium priority items and low priority items, are established in a scheduler. The higher priority items are always serviced first (e.g., there is typically a control algorithm on the network device 140 that is actually doing some computations and controlling the and actuators of the device and reading the sensors of the device). All other threads are forced to operate in the background, particularly any processes that would be initiated in the communication address space 146. A signal comes in, is handled, but then the data just sits until the processor 150 has time to actually determine the request kind. Regardless of what kind of request it is, the request is always going to be given a lower priority than the control algorithm.

Figure 6:
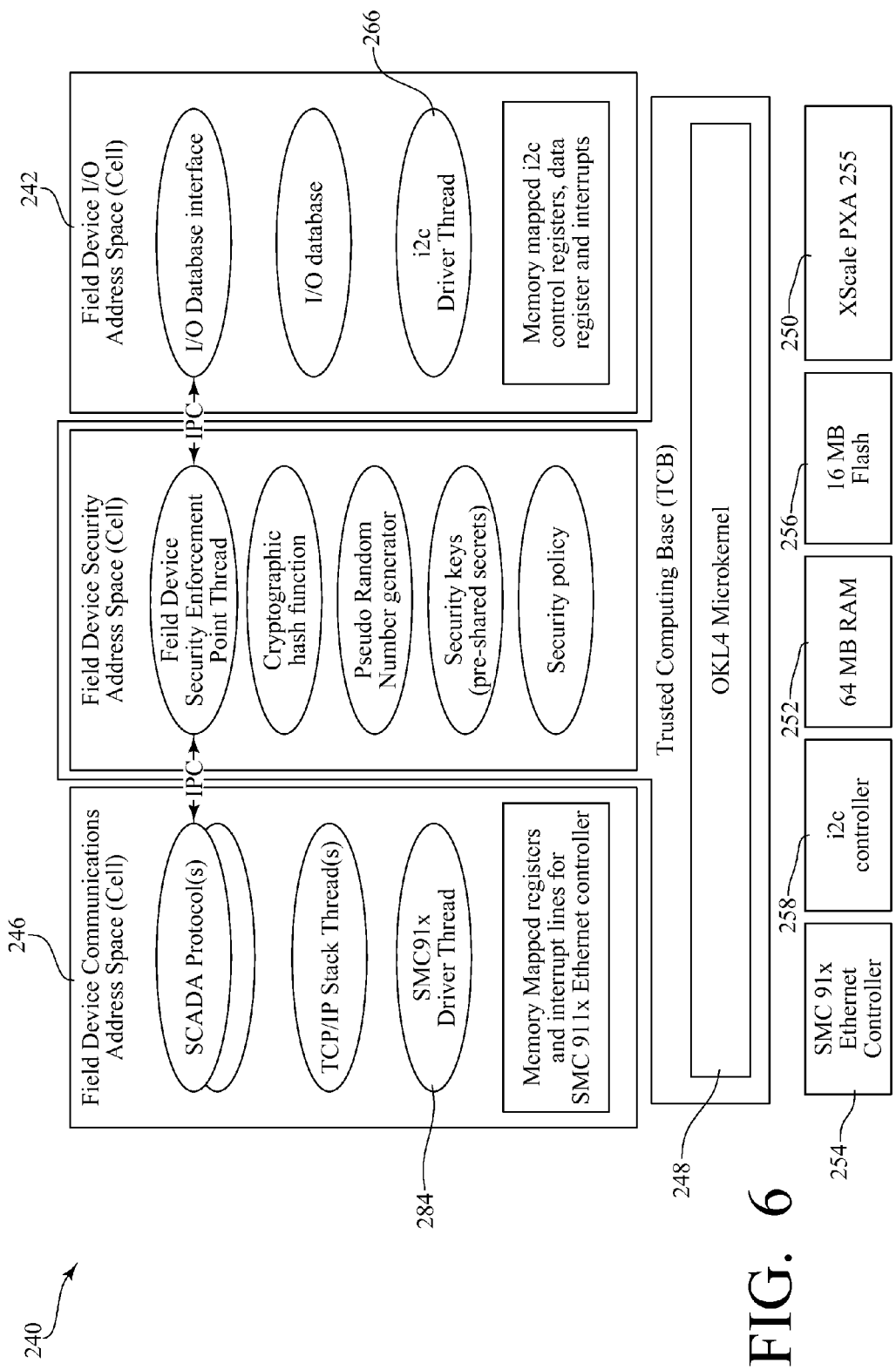
FIG. 6 is a schematic representation of another exemplary security enhanced network device.

FIG. 6 is a schematic representation of another exemplary security enhanced network device 240 (an exemplary development platform implementation of a prototype security-hardened field device) substantially in accordance with the exemplary security enhanced network device 140 of FIG. 5. In the network device 240 of FIG. 6: a microkernel 248 is an OKL4 microkernel; a microprocessor 250 is an XScale PXA 255 Processor, a memory 252 is a 64 MB RAM, and an Ethernet controller 254 is a SMC 91× Ethernet controller operated by a SMC 91× driver thread 284 in a communication address space 246. Additionally, a flash memory 256 is a 16 MB flash memory, and an IO controller 258 is an i2c controller operated by an i2c driver thread 266 in a protected operations address space 242. The other elements of the exemplary network device 240 are substantially the same as the corresponding elements in the exemplary network device 140 of FIG. 5.

Figure 7:
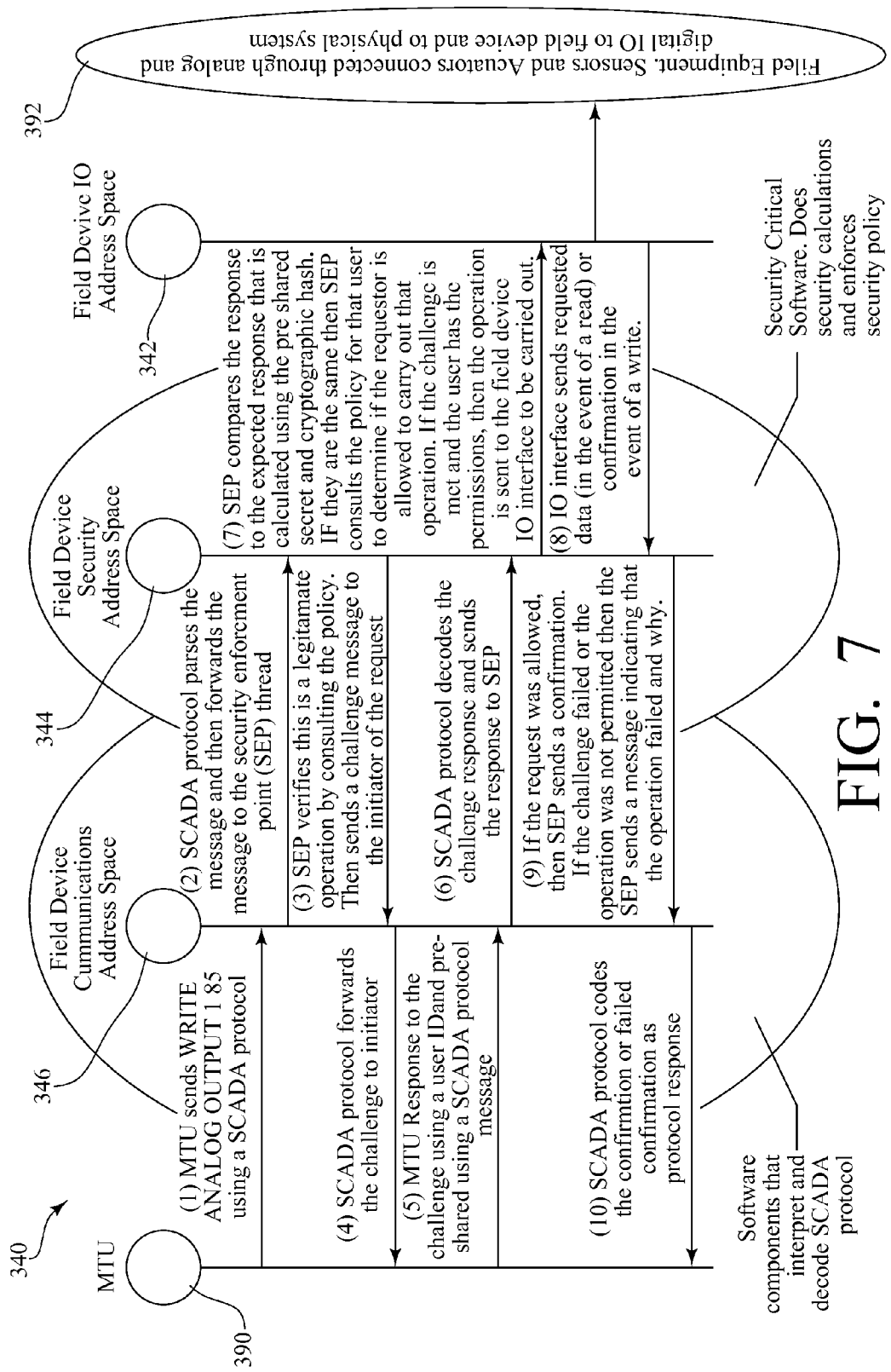
FIG. 7 is a call flow diagram of exemplary communication between a Master Terminal Unit and the elements of a typical Security Hardened Field Device.

FIG. 7 is a call flow diagram of exemplary communication between a Master Terminal Unit (MTU) 390 and the elements of a typical Security Hardened Field Device (SHFD) 340 as described above. When in place in a typical SCADA setting, the SHFD 340 interfaces with the SCADA communications network and field equipment 392 (sensors and actuators) through analog and digital IO lines.

The MTU 390 (at the request of a human operator) initiates a control message (1), for example: WRITE ANALOG OUTPUT 1 85. This message is encoded using SCADA protocol, such as DNP3 or MODBUS. The SCADA message is then wrapped in TCP/IP for transport to the SHFD 340 (RTU) via a network that supports TCP/IP (commonly Ethernet within a plant). The message (1) initially arrives through a hardware network interface, which is controlled by a software driver. The driver decodes the message (1) and passes it to a TCP/IP stack, which delivers to a SCADA protocol thread (e.g., FIG. 5, element 180) in a communication address space 346, just the SCADA protocol message.

The SCADA protocol thread then converts the message into a device specific message (2). The SCADA protocol thread cannot directly carryout the request, as it has no access to the IO Database interface thread (e.g., FIG. 5, element 168) in a protected operations address space 342. Instead the SCADA protocol thread forwards the parsed message (2) to a security enforcement point thread (e.g., FIG. 5, element 170) in a security enforcement address space 344. Continuing with the example, the parsed message (2) is to change analog output 1 to 85. The security enforcement point thread first verifies this is valid and legal operation. If it is not, it sends an error message (not shown) back to the SCADA protocol thread.

If the request is valid and legal, then the security enforcement point thread responds with a challenge message (3). The challenge message (3) is an authentication request, and the challenge message (3) includes a random nonce value generated by the security enforcement point thread.

The SCADA protocol thread then codes a challenge message (4) for the specific SCADA protocol. For example, DNP3 already has a challenge response authentication specification. For protocols without such specification, it is necessary to add a challenge procedure to the protocol specification.

The challenge message (4) is then delivered to the MTU 390, and possibly to an HMI, where the initiator of the request generates a challenge response message (5) using a pre-shared secret that they posses and the nonce value generated by the security enforcement point thread. The message is then coded as a SCADA protocol message, sent to the field device, and decoded by the SCADA protocol thread.

The SCADA protocol thread then forwards a as response message (6) to the security enforcement point thread. The security enforcement point then compares the response to its expected response, using the local cryptographic hash functions and pre-shared secret. If the response matches then the requestor is considered authenticated, and the user id of the requestor is associated with the user id the initial request. A security policy (FIG. 5, element 178) is then consulted to determine if the requestor (user id) has permission, according to the security policy, to carry out the operation.

If the requestor has permission, then the security enforcement point thread sends an appropriate operation message (7) to the IO database interface thread, if not an error message is returned to the SCADA protocol thread.

After completion of the IO transaction, the IO database interface thread returns a message (8) to the security enforcement point thread, which returns a message (9) to the SCADA protocol thread, which returns a message (10) to the MTU 390.

In the event of a malicious user discovering and exploiting a vulnerability in the network driver thread software, the TCP/IP stack thread(s), or the SCADA protocol thread(s) (which is likely 10 or 100's of thousands of lines of code) the malicious user cannot access the IO database interface thread, the IO Database, or the IO driver thread, as these are not in the communication address space 346. Furthermore, the malicious user cannot modify the cryptographic hash functions, random number generator, or read or modify the security keys. Thus the critical operations of the field device are protected. Restarting the communication address space (from know good write one read many location) could then restore the communication address space to operational status.

One of ordinary skill in the art will recognize that additional steps and configurations are possible without departing from the teachings of the invention. This detailed description, and particularly the specific details of the exemplary embodiments disclosed herein, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A method of operation of a microkernel executing on a processing device, the method comprising:
   partitioning, by the microkernel, a network device into a communication address space, a security enforcement address space, and a protected operations address space;
   providing secure isolation of the protected operations address space from the communication address space, by security threads of the security enforcement address space; and
   allocating, by the microkernel, a limited amount of processor execution time to the communication address space, the protected operations address space, and the security enforcement address space such that no thread of any of the communication address space, the protected operations address space, and the security enforcement address space can obtain unlimited processor execution time;
   mediating communication between the communications threads, the protected operations threads, and the security threads;
   receiving an identity of a sender of an inter-process communication; and
   providing the identity of the sender to a receiver of the inter-process communication, such that the identity of the sender cannot be forged;
   wherein the protected operations are field device control and data acquisition operations in a supervisory control and data acquisition system; the method further including:
      authenticating, by a field device security enforcement point thread of the security threads, a request from Supervisory Control and Data Acquisition (SCADA) protocol threads of the communication threads via inter-process communication, then, if authenticated:
         making a request to an I/O database interface thread of the protected operations threads; and
         forwarding a response back to the SCADA protocol threads
   wherein the step of authenticating the request from the SCADA protocol threads further includes:
      verifying that the request is a legitimate operation by consulting a security policy stored in the security enforcement address space;
      sending a challenge message to an initiator of the request;
      comparing a response to the challenge message to an expected response calculated using a pre-shared secret, nonce, and a cryptographic hash function, then, if the response to the challenge message matches the expected response:
         consulting the security policy for the initiator of the request to determine if the initiator is allowed to carry out the operation.

* * * * *